Jan. 14, 1941.                R. E. WARNER                2,228,331
                       EXAMINATION CONDUCTING DEVICE
                            Filed Nov. 27, 1939
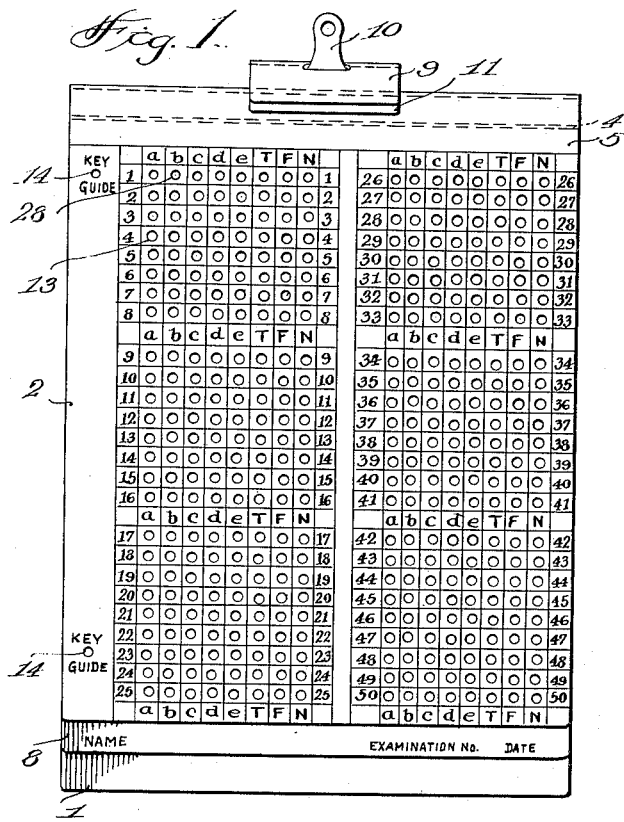
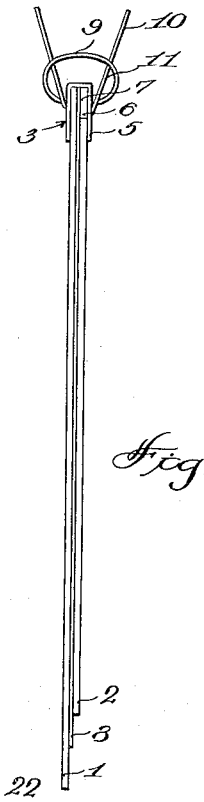
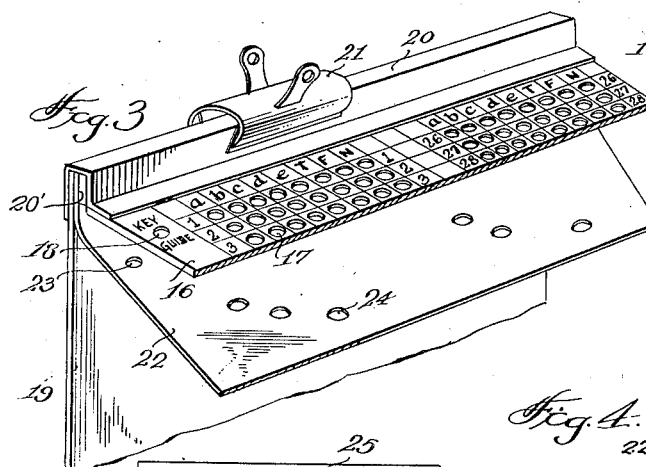
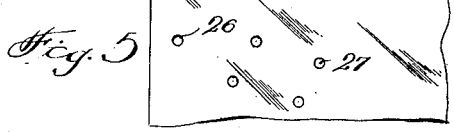
Raymond Eugene Warner
INVENTOR
BY Victor J. Evans & Co.
ATTORNEYS Patented Jan. 14, 1941

2,228,331

UNITED STATES PATENT OFFICE 2,228,331

EXAMINATION CONDUCTING DEVICE

Raymond Eugene Warner, King City, Calif.

Application November 27, 1939, Serial No. 306,359

1 Claim. (Cl. 35—48)

This invention relates to educational examination conducting devices, and its general object is to provide a device for use in conducting the so-called short answer examinations, that is those in which the questions are commonly known as the "multiple choice" type, "true"—"false"—"neither" type, etc., and which are answered by the student indicating one answer taken from two or more in a group, for example, each answer in the group for the "multiple choice" type has a designating character, for example the letter $a$ designates the first answer in the group, the letter $b$ the second, the letter $c$ the third and so forth, and the student merely indicates one of the letters as his choice in answering the question, while in the other type of questions above mentioned, the student indicates either the word "true," "false" or "neither."

A further object is to provide a device of this character that includes an examination taking board for use by the student and a correction sheet for use by the teacher, the examination board having a plurality of holes therethrough, one for each answer, and for use by the student in marking the answer sheet, while the correction sheet which may be either opaque or transparent, has holes therein, if opaque and marks in the form of circles thereon, if transparent, but is provided only with one hole or circle for each correct answer, in that the correction sheet is for use by the teacher to be placed over the answer sheet, to ascertain the number of correct answers thereon, as will be apparent.

An extremely important object is the provision of key guide holes through the student's board and the teacher's correction sheet, the key guide holes in the student's board being adapted for use by the student in marking the answer sheet with key marks, so that in correcting, the key guide holes of the correction sheet are disposed to coincide with the marks on the answer sheet, and such will position the correct answer holes or circles, as the case may be, of a correction sheet, properly arranged with respect to the answer sheet, therefore, it will be seen that the answer and correction sheets do not have to be of any particular or uniform size, as is required by devices of this chaarcter now in general use in order for the correction means to exactly fit the answer sheet.

Another object is to provide an examination conducting device in which the student's board, or a like board with larger holes therein than that of the student's board may be used for making the correction sheets from either opaque or transparent paper, merely by using the holes in either board as guides, for punching the key guide and correct answer holes in the opaque paper and in drawing circles on the transparent paper, for the key guides and where the correct answers appear.

A further object is to provide an educational examination conducting device that eliminates the expense of supplying new question sheets for each examination, as it is not necessary to mark the question sheets, and they can be used from time to time for any number of examinations.

A still further object is to provide a device of this character by which the student can take the examination and the teacher can correct the papers in an easy and expeditious manner, and the device in its entirety is simple in construction, inexpensive to manufacture, and extremely efficient in use and service.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:

Figure 1 is a top plan view of the device, with an answer sheet therein for use by the student.

Figure 2 is a side elevation of Figure 1.

Figure 3 is a slightly modified form of the device to be used for making the correction sheets for use by the teacher.

Figure 4 is a fragmentary plan view illustrating an opaque correction sheet having key guide and correct answer holes therein, and being applied to an answer sheet for correcting the same.

Figure 5 is a view illustrating a portion of a transparent correction sheet having circles thereon providing the key guide and correct answer indicating means.

Referring to the drawing in detail, the reference numeral 1 indicates the base or back board, which is made of any suitable stiff self-supporting material, such as metal, heavy cardboard or the like into rectangular shape, in the form shown, but of course it will be understood that it can be of any suitable shape as its main purpose is to provide a support and flat writing surface.

The student's or examination taking board 2 is fixed to the base board 1 by any suitable means, but the means shown includes a hinge element 3 that is made from any suitable fabric material, or the like, folded along its length in channel formation to provide front and rear walls, the rear wall being adhesively secured to the rear face of the base board and the front wall is provided with a fold line 4 extending longitudinally thereof to provide a hinge portion 5 adhesively secured to the board 2 for hingedly connecting the latter to the base board. The board 2 is cut as at 6 to provide a clamping strip 7 that cooperates with the base board to set up a clamping engagement with the upper end portion of the examination or answer sheet 8, for detachably securing the same between the boards 1 and 2, as clearly shown in Figure 2.

Any suitable means may be employed to bring about the clamping engagement of the strip 7 with the answer sheet, for securing the latter against casual displacement or removal, and I have illustrated a spring clamp for that purpose, the clamp being of the type that includes a barrel like spring body 9 having slots therein for receiving the handles 10 of jaws 11 that are urged in clamping association by the spring body, as will be apparent upon inspection of Figure 2.

The examination taking board 2 is perforated or in other words provided with a plurality of holes 13 preferably arranged in groups, there being six groups in the form shown, and sixty-four holes in each group. The board is divided by lines into blocks, with a block for each hole and at the upper end of each row of holes in each group, is a designating letter for each row, the letter *a* for the first row, the letter *b* for the second row, the letter *c* for the third row, the letter *d* for the fourth row, and the letter *e* for the fifth row, while the next three rows are designated respectively by the letters T, F and N, the letter T being the first letter of the word "true," the letter F the first letter of the word "false," and the letter N the first letter of the word "neither," with the result it will be seen that each of the vertical rows in each group are designated by letters, but the horizontal rows are designated by numerals at each end thereof, and in numerical order from 1 to 50, as shown.

The board 2 is provided with a pair of additional holes 14, disposed adjacent to the left hand edge thereof, and one of the holes 14 is arranged adjacent to the upper end of the board 2, while the other is adjacent to its lower end. The holes 14 have the words "key guide" to designate the same, in that they are used by the student in making key marks 15 on the answer sheet 8, as shown in Figure 4, for a purpose which will be later described.

The correction sheets for use by the teacher and as shown in Figures 4 and 5, may be made from either opaque or transparent material, and by the use of the student's board 2 or a perforated board 16 substantially identical to the student's board, in that the board 16 is provided with the same indicia and holes 17 and 18 arranged in the same manner, as the holes 13 and 14, but the holes 17 and 18 are of greater diameter than the holes 13 and 14. The board 16 is preferably likewise secured to the base board 19 by a fabric hinge element 20 and a clamping strip 20', the element 20 being similar to the element 3 and the strip 20' similar to the strip 6. A spring clamp 21 is also used for clamping plain sheets of paper between the boards 16 and 19, when making the correction sheets.

In making the opaque correction sheet 22, as shown in Figure 4, and with the use of the student's device as shown in Figure 1, a sheet of opaque paper is clamped between the boards 1 and 2. Circles are then drawn on the sheet, so clamped, through the key guide holes 14 and the holes 13, it being understood that only the holes 13 where the correct answers appear are used, in this instance. After the circles have been drawn on the sheet, it is removed and holes are punched therein where the circles appear, the holes 23 being the key guide holes and the holes 24 the correct answer holes, and are of a greater diameter than the circles.

In making the transparent correction sheet 25, as shown in Figure 5, a sheet of transparent paper is placed between the boards 1 and 2, and the circles are drawn thereon in exactly the same manner as above set forth, but holes are not punched in the sheet 25, as such is unnecessary due to the transparency thereof. The circle 26 represents one of the key guide marks, and the circles 27 some of the correct answer marks.

When the opaque correction sheet 22 is made by the use of the device as shown in Figure 3, it is not necessary to draw the circles, as the holes 23 and 24 can be punched in their proper size or diameter directly through the holes 17 and 18, but the holes 17 and 18 are used for drawing circles on the transparent correction sheet when the latter is made with the device of Figure 3. The holes 23 and 24 may be punched by any suitable means, such as a punch including pivoted handles or a tap type punch, and when the latter is used, the base board 19 will provide suitable supporting means therefor, as will be apparent.

In the use of my device, it is believed that it will be obvious that in conducting the examination, a student is given a question sheet and one of the devices as shown in Figures 1 and 2. The student then attaches his answer sheet to the device for disposal between the boards 1 and 2 and after applying his name, examination number and date to the answer sheet, which is preferably slightly longer than the board 2 for disposal below the same, as best shown in Figure 1, he then applies the key marks 15 to the answer sheet by inserting the writing implement through the key holes 14. He then proceeds to answer the questions by selecting the answers which he deems to be correct and marks the answer sheet through the openings 13, his answers being indicated by the marks 28, as shown in Figure 4.

It is believed that the type of questions referred to, are well known, but it might be mentioned that an example of a "multiple choice" question is as follows:

1. The United States fought the war of 1812 with:
      *a.* Great Britain
      *b.* France
      *c.* Germany
      *d.* China
      *e.* Spain With respect to "true"—"false"—"neither" questions, the following are examples.

2. Patrick Henry said "If this be treason make the most of it."
3. Columbus discovered America in the year 1607.
4. The electric light was invented by
      Robert Fulton
      Alexander Graham Bell
      Benjamin Franklin
      Guglielmo Marconi In correcting the examination papers or answer sheets, they are placed one at a time below either an opaque correction sheet or a transparent correction sheet, and arranged so that the key marks 15 coincide with the holes 23 of the opaque sheet or the circles 26 of the transparent sheet. When so arranged, the holes 24 or circles 27, as the case may be, will be disposed with respect to the answer sheet, at the places where the correct answers should appear, consequently it will be obvious that the teacher or person correcting the papers by looking through the holes 24 or circles 27, can see at a glance the number of questions answered correctly and mark the answer sheet accordingly, it being apparent that if the questions is answered correctly, the student's marks 28 will appear through the openings 24 or circles 27, but if incorrectly no marks will appear.

From the above description and disclosure in the drawing, it will be obvious that by the use of my device an examination can be conducted and the papers corrected in an easy and expeditious manner, and due to the fact that the board 2 is hingedly associated with respect to the board 1, it will be further obvious that a student can change a previously answered question while taking the examination in the event he feels that his first answer is incorrect. The hinged association of the boards 1 and 2 likewise materially expedite the application and removal of the answer sheets, without entirely removing the spring clamp from the hinge element 3.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

In a question and answer examination conducting device and a correction sheet for use with an answer sheet marked by a student using the device, said correction sheet being provided with key means and means to indicate the correct answers to identified questions on a question sheet, and said device comprising a back board providing supporting means for the answer sheet, a board provided with a plurality of writing implement receiving perforations for marking the answer sheet therethrough and being arranged in rows identified in accordance with the questions, the latter board having additional writing implement receiving perforations therein for use in providing key marks on the answer sheet for the key means of the correction sheet to coincide therewith for disposing the correct answer indicating means of the latter sheet properly positioned with respect to the answer sheet when correcting the latter, a fabric hinge element folded along its length in channel formation to form a front wall and a back wall, said front and back walls being adhesively secured to the perforated board and back board respectively, a clamping strip adhesively secured to the front wall for engagement with the answer sheet along an edge portion thereof for holding the answer sheet between the strip and the back board to allow hinged movement of the perforated board to enable the student to change the answers without moving the answer sheet, and means for clamping the answer sheet between the strip and the back board.

RAYMOND EUGENE WARNER.